Jan. 30, 1934.  H. P. LLOYD  1,945,325

NUT LOCK

Filed Sept. 30, 1931

Inventor
Harry P. Lloyd.

By H S Woodward
Attorney

Patented Jan. 30, 1934

1,945,325

UNITED STATES PATENT OFFICE 1,945,325

NUT LOCK

Harry P. Lloyd, Wilmington, Del.

Application September 30, 1931
Serial No. 566,111

2 Claims. (Cl. 151—31)

The invention relates to nut locks of that type in which the bolt is split at the end over which the nut is engaged, and a screw device is employed to expand the end of the bolt after the nut is screwed home against the work. Among the features of the device embodying my invention are: a bolt liable in a minimum degree to failure by fracture under normal stresses; use of a minimum of material and machine work; small bulk; absence of objectionable projections; a locking member effective at all positions of engagement.

It is an object of my invention to enable the retention of the full cross section of the bolt without bore, for a substantial distance outward of the face of the work, taking full advantage of the normal maximum strength of the bolt.

An advantage of my invention is that an extremely short lock screw may be used and that this screw is effective to the maximum at all positions.

Figure 1:
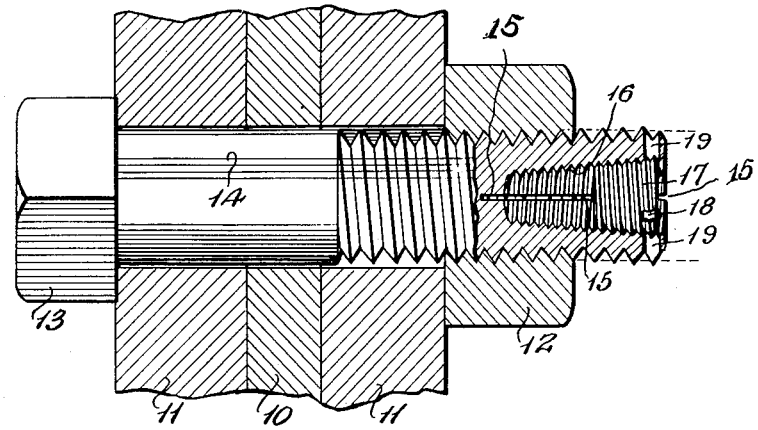
Figure 1 is a fragmentary longitudinal section of a track joint including fishplates and bolt in which my invention is incorporated.

There is illustrated a portion of the web 10 of a railroad rail, against opposite sides of which there are clamped the fishplates 11, confined between the nut 12 and head 13 of the bolt 14. The bolt is split by means of a very narrow diametrical slit 15 extending from its threaded extremity a distance stopping short of the outer face of the adjacent fishplate.

A coaxial interiorly threaded recess or bore 16 is formed in the threaded extremity of the bolt, and in this there is engaged a biscuit-shaped screw 17, extremely short in proportion to its diameter, and as shown also less than one half the length of the bore. In practice it has had only four or five threads. The bore may be very large at the outer part and tapers toward the inner part where it may be of less diameter than the small end of the screw. The bore is ovate in cross section with the major axis of the oval coincident with the slit 15. The purpose of this is to avoid wedging of the screw between the corners of the bore at the edges 15, which would materially increase the force required to move the screw into full engaged position. The making of the bore ovate may be done by tilting the tool or the bolt, or moving the tool and bolt relatively in the plane of the slit 15 as necessary. The screw is formed with a transverse slot 18 in the top face, and in the bolt close to the extremity there is a series of diametrical openings 19 through two of which a cotter pin may be inserted to secure the screw in adjusted positions.

It should be noted that the bore 16 is of less depth than the slit 15, the slit 15 being extended into the bolt a distance beyond the bore so that an ample amount of material may be strained when the nut is locked, thus avoiding liability of fracture by excessively localized strain in the expansion of the bolt end, and also securing a more extensive binding engagement of the threads of the bolt 14 with the nut 12.

Figure 2:
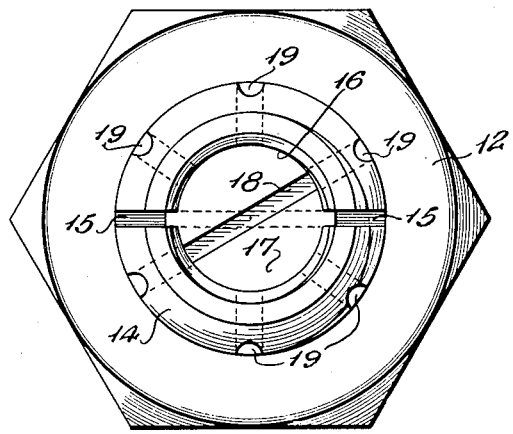
Figure 2 is an end view of the bolt nut and lock assembly.

The bolt is illustrated full size in Figure 1 of the drawing and larger in Figure 2.

The nut may be released and removed without damaging the bolt, and the whole assembly used repeatedly, the strain of the bolt necessary to bind the nut being within the elastic limits of the usual material employed in such bolts. The force necessary to strain the end portions of the bolt sufficiently by use of the screw 17 is within the limit of force that may be exerted manually by the ordinary workman using a screw driver. Owing to the taper of the bore the expansion of the bolt will progressively increase toward the extremity when the screw is engaged, so that not only is the nut frictionally bound on the bolt, but unscrewing thereof is positively blocked by the widened material of the bolt. When the screw 17 is engaged to the maximum depth, being headless, it may be just within the end of the bolt, preferably, and in this way the two end portions of the bolt are mutually braced and the threads and bore protected from damage by being struck by tools or other objects as well as dirt kept out. However, on account of the short length of the screw, in case the nut and bolt vary from standard fit, and are very loose, the screw may be readily screwed further than usual to compensate for faulty manufacture in this respect, increasing the effectiveness of the mesh of the threads on bolt and nut, as well as attaining uniform locking effect. The screw threads and those of the bore may be of any usual size convenient for the parts, and the bolt 14 may be standard in proportions and machining of its threads for the nut. The nut 12 may be produced under standard practices.

The proportions of the bore in relation to the bolt 14 may be varied, especially by reducing the diameter of the bore 16 and the screw 17, as these may be materially smaller without impairing the efficiency of the device.

I claim:—

1. A bolt and nut lock comprising an exteriorly threaded extremity, a narrow slit being formed diametrically therein extending from the extremity longitudinally into the bolt to a position short of the face of the work engaged by the nut, a tapered interiorly threaded bore being formed in the extremity of the bolt, and a headless tapered screw engaged in the bore of a length much less than that of the bore and of a diameter to permit the outer extremity to lie a distance within the bore when in locking positions, said bore stopping short a material distance from the plane of the face of work engaged by the nut, said bore being transversely ovate, its major transverse axis being coincident with the slit.

2. In a nut lock of the character described, a split end bolt having an axial, threaded, arcuately shaped, and diametrically slitted recess, the radii of curvature of the portions of said recess near said diametrical slits being greater than the radii of said recess perpendicular to the plane through said slits.

HARRY P. LLOYD.